United States Patent

Hobson et al.

[11] 4,074,698
[45] Feb. 21, 1978

[54] HYDRAULIC COUPLER

[75] Inventors: Willis S. Hobson, Columbus; Elmer A. Graber, Seymour, both of Ind.

[73] Assignee: Seymour Manufacturing Co., Inc., Seymour, Ind.

[21] Appl. No.: 708,547

[22] Filed: July 26, 1976

[51] Int. Cl.$^2$ .................... F16L 37/28; F16L 29/00
[52] U.S. Cl. .................... 137/614.06; 137/614.04; 285/1
[58] Field of Search .................... 137/614.04, 614.06; 285/1

[56] References Cited
U.S. PATENT DOCUMENTS 3,710,823  1/1973  Vik .................... 137/614.06

*Primary Examiner*—Alan Cohan
*Assistant Examiner*—Gerald A. Michalsky

[57] ABSTRACT

An automatic coupling device having a body member movably mounted on a mounting plate fixed to the implement, and a sleeve member movably mounted on the body member. A releasable device between the mounting plate and the sleeve member releasably retains a coupler nipple on the sleeve member, the nipple including a first valve element urged toward a closed position and being movable to an open position. A valve body is slidably mounted in a bore of the sleeve member, the valve body having a passage with an inlet end for connection to a fluid line, and being movable to a first position to preclude substantially relative movement of the sleeve member and body member for locking of the nipple in the releasable device, and being movable to a second position to allow relative movement of the sleeve member and body member for insertion of the nipple into the releasable device. A cam is connected to the valve body for sliding the valve body in the bore of the sleeve member and for moving the valve body between the first and second positions. The valve body includes a second valve urged to a closed position and being movable to an open position, the first and second valves engaging and opening when the valve body is in the first position and the nipple is attached to form a fluid passageway through the valve body and nipple, and disengaging and closing when the valve body is moved to the second position, even when the nipple is attached.

9 Claims, 4 Drawing Figures

HYDRAULIC COUPLER

BACKGROUND OF THE INVENTION

This invention relates generally to improvements in an automatic coupling device for use in a fluid circuit, and more particularly to a quick disconnect hydraulic line coupler actuated by a cam to permit closing off of the flow through the coupler so that the coupling parts can be isolated from any hydraulic pressure present on the lines during coupling or decoupling operation, and which also permits closing off the flow even when the coupling parts are still coupled together physically.

Many hydraulic couplers in the past have included quick disconnect features and some have even included shut-off valves. For example, U.S. Pat. No. 2,675,829 shows a quick disconnect coupling made with a selectively operated shut-off valve. Other couplers of this general type are shown in the U.S. Pat. No. 2,675,829, U.S. Pat. No. 3,129,919, and U.S. Pat. No. 2,625,410.

Further, a hydraulic coupler which has a shut-off feature of this general type is shown in U.S. Pat. No. 3,710,823. However, in this prior patent, the internal valves could be unintentionally opened under hydraulic line pressure during the act of nipple connection.

SUMMARY OF THE INVENTION

The present hydraulic coupler uses a cam to move and condition internal parts of the coupler so that fluid flow through the coupler parts is shut-off while the coupler parts remain mechanically connected. In the "off-close" position, the coupler parts can be connected or disconnected easily regardless of pressure in either or both of the lines connected to the coupler parts. There is no need to overcome the force of the hydraulic pressure in the lines for connecting as is common in ordinary hydraulic couplers.

Moreover, with the present hydraulic coupler, the coupler nipple cannot be operatively inserted into the releasable device and automatically attached to its co-operating coupler part if the internal valve of the cooperating coupler part has been unintentionally conditioned by the actuating cam to its "on-close" position. Consequently, it is impossible to unintentionally connect the coupler nipple under hydraulic line pressure or open the internal valves unintentionally under hydraulic line pressure in attempting to connect the nipple. The internal valve of the cooperating coupler must be conditioned by the actuating cam to the "off-close" position before the coupler nipple can be connected.

The automatic coupling device includes a valve body means having a passage with an inlet end for connection to a fluid line, the valve body means being slidably mounted in the bore of a sleeve member that is movably mounted on a body member that is movably mounted on a mounting means. The valve body means is movable to a first position to preclude substantially relative movement of the sleeve member and body member for locking a coupler nipple in a releasable means disposed operatively between the mounting means and the sleeve member, and being movable to a second position to allow relative movement of the sleeve member and body member for effective insertion of the nipple into the releasable means. A cam means is connected to the valve body means for sliding the valve body means in the bore of the sleeve member, and for moving the valve body means between the first and second position. A first valve means in the nipple and a second valve means in the valve body means, engage and open when the valve body means is in the first position and the nipple is attached to form a fluid passageway through the valve body means and nipple, and disengage and close when the valve body means is moved to the second position, even when the nipple is attached.

A resilient means urges the sleeve member to a position to lock the releasable means, the sleeve member being movable against the loading of the resilient means when the valve body means is in the second position, upon insertion of the nipple in the releasable means.

The valve body means in the first position engages the sleeve member to preclude relative movement of the sleeve member and body member, and precludes insertion of the coupler nipple into the releasable means, and in the second position is spaced from the sleeve member to permit relative movement of the sleeve member and body member and enable effective insertion of the nipple into the releasable means.

The sleeve member is movable to a first position relative to the body member to lock the releasable means, and is movable away from its first position relative to the body member to unlock the releasable means when the valve body means is in its second position. When the valve body means is in its first position, it engages the sleeve member in its first position to preclude substantially relative movement of the sleeve member and body member, and precludes effective insertion of the nipple into the releasable means. When the valve body means is in its second position, it is spaced from the sleeve member in its first position to enable movement of the sleeve member away from its first position, and permits effective insertion of the nipple into the releasable means for locking to the sleeve member.

DESCRIPTION OF THE PREFERRED EMBODIMENT

Figure 1:
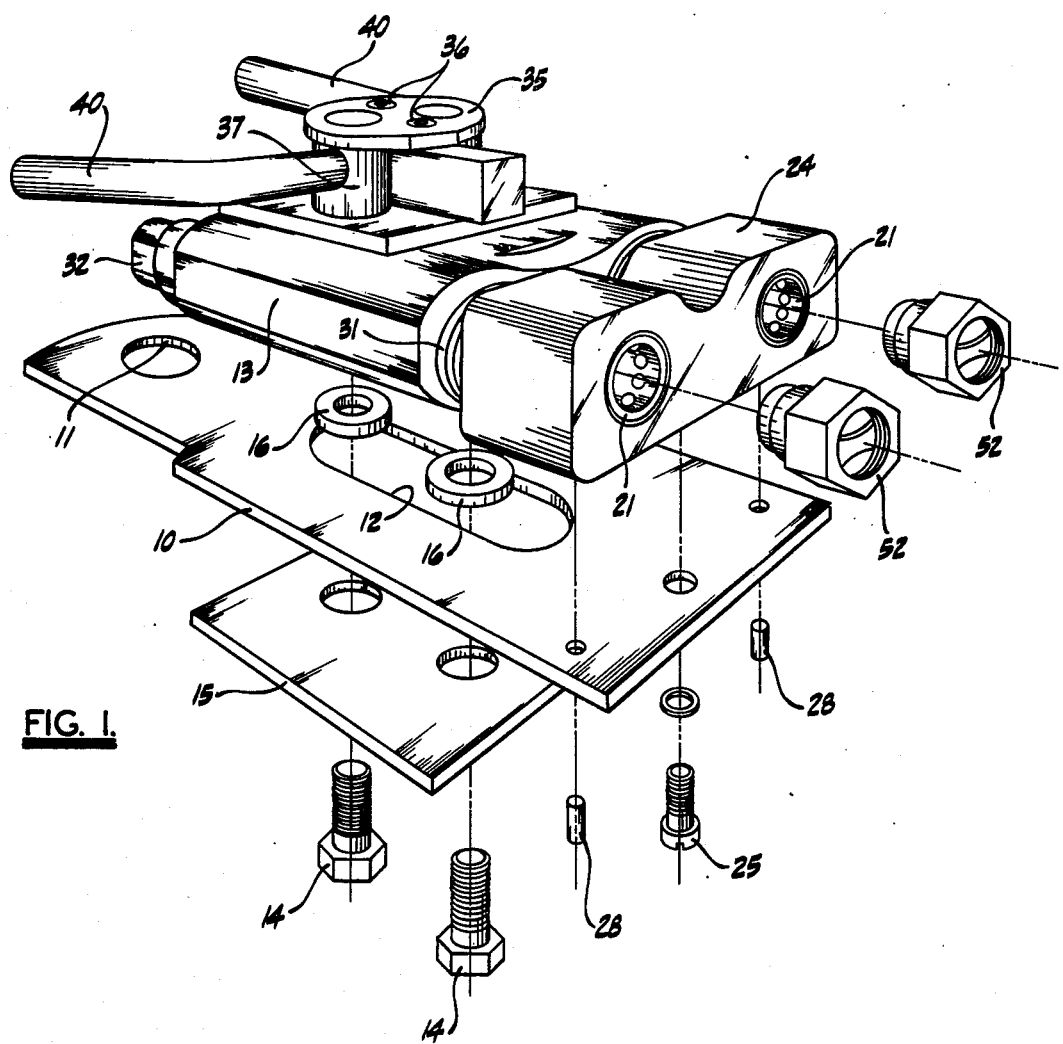
FIG. 1, is an exploded perspective view of the coupling device.

Referring now by characters of reference to the drawings, it will be understood that the automatic coupling device includes a mounting plate 10 that is fixed to the tractor frame by a suitable fastener (not shown) inserted through a plate hole 11. Formed in the mounting plate 10 is an elongate slot 12. The purpose of the slot 12 will be discussed in detail after further description of the parts.

A body member 13 is movably mounted on the mounting plate 10. A pair of spaced threaded bolts 14 extend through a bottom plate 15 and through guide bearings 16, and are threadedly attached to the body member 13. The guide bearings 16 are slidably located in the mounting plate slot 12. The bottom plate 15 is clamped against the guide bearings 16, and has sufficient clearance with the mounting plate 10 so that the guide bearings 16 can slide longitudinally in the slot 12.

The present assembly provides a pair of couplers as is illustrated in FIG. 1. The structure and function of one of these couplers will be described in detail with reference to FIGS. 2-4, and such detailed description will suffice for the other.

The body member 13 is provided with a longitudinal bore 17 therethrough for each coupler, the bore 17 including an internal shoulder 20 near one end.

Slidably mounted in the body member bore 17, is a sleeve member 21, the sleeve member 21 being provided with a longitudinal bore 22 therethrough. The sleeve member 21 includes an abutment 23 that engages the internal shoulder 20 to determine the extended first position of the sleeve member 21.

A releasable means includes a collar 24 constituting a first locking element, fixed to the mounting plate 10 by a threaded cap screw 25. As is illustrated in FIG. 1, the collar 24 is a unitary transverse piece that serves the same function for the other coupler. The collar 24 is provided with a pair of internal longitudinally spaced grooves 26 and 27, the purpose of which will later be described.

In addition, the releasable means includes a plurality of locking balls 30, constituting second locking elements, carried in compatible holes formed in the sleeve member 22 near one end thereof. As is usual, the locking balls 30 can extend partially into the bore 22 of the sleeve member 21.

One end of the collar 24 is recessed to receive a compression spring 31, constituting a resilient means, that is disposed about the sleeve member 21. One end of the spring 31 engages both the sleeve member 21 and the collar 24, and the other end of the spring 31 engages both the sleeve member 21 and the body member 13. Consequently, the spring 31 has a dual function. First, the sleeve member 21 can be moved away from its first position under spring loading, and secondly, the body member 13 and sleeve member 21 can be moved as a unit longitudinally relative to the mounting plate 10 against the loading of the spring 31 as permitted by the sliding movement of guide bearings 16 in the plate slot 12.

Slidably mounted in both the body member bore 17 and the sleeve member bore 22, is a valve body means 32. The outer, inlet end of the valve body means 32 can be connected by a conduit (not shown) to a source of fluid under pressure. This fluid would then be fed through the hydraulic coupler to a remote hydraulic cylinder or other equipment (not shown).

An O-ring 33 is carried by the sleeve member 21 and engages the valve body means 32 to provide a fluid seal therebetween. The valve body means 32 also is provided with a passage 34 longitudinally therethrough.

An actuating cam means includes a cam-retaining plate 35 fixed to the body member 13 by a pair of cap screws 36. As is shown in FIG. 1, the cam-retaining plate 35 extends transversely of the body member 13 for use with the other coupler also. Rotatively mounted in the cam-retaining plate 35 and the body member 13 is a cam cylinder 37. A handle 40 is attached to the cam cylinder 37, and is adapted to rotate the cylinder. Attached to the lower end of the cam cylinder 37 and eccentrically offset from the rotative axis of the cylinder 37, is a cam 41, the cam 41 being slidably located and received in a compatible cam groove 42 formed annularly in the outer periphery of the valve body means 32.

Figure 4:
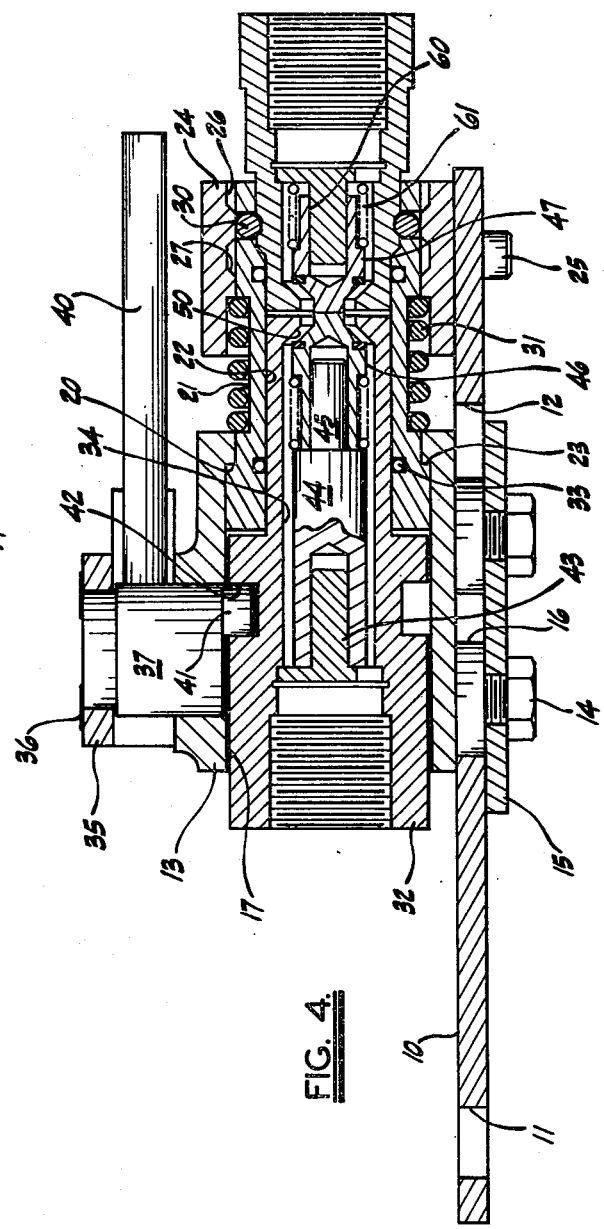
FIG. 4, is a longitudinal cross-sectional view similar to FIG. 3, showing the internal valve means engaged and open.

When the cam cylinder 37 is rotated by the handle 40 to the position illustrated in FIG. 4, the cam 41 will move the valve body means 32 to a first position closely adjacent the sleeve member 21 so as to preclude effective relative movement of the body member 13 and sleeve member 21, and effectively precludes movement of the sleeve member away from its first position in which the locking balls 30 are urged inwardly by the cooperating locking collar 24 and effectively lock the releasable means.

Figure 3:
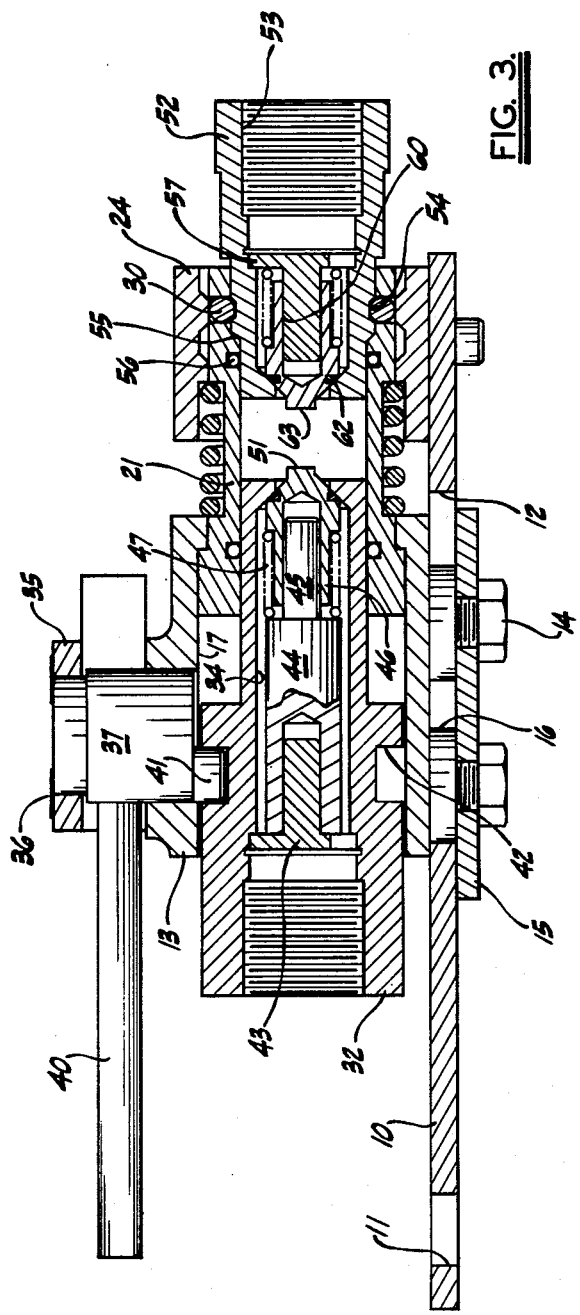
FIG. 3, is a longitudinally cross-sectional view, similar to FIG. 2, and showing the nipple attached and the internal valve means disengaged and closed.

When the cam cylinder 37 is rotated by the handle 40 to the position illustrated in FIG. 3, the cam 41 moves the valve body means 32 to a second position in which the valve body means 32 is spaced from the sleeve member 21, and thereby allows relative movement of the body member 13 and sleeve member 21 and allows movement of the sleeve member 21 away from its first position so that the locking balls 30 can be urged radially into the compatible groove 27 in the locking collar 24, whereby to effectively unlatch the releasable means.

The valve body means 32 includes a valve means in the passage 34. This valve means includes a stud 43 fixed in the passage 34 by a retaining ring, the stud 43 having a head with passageway therethrough and a longitudinal shank. Mounted on the shank of stud 43 is an elongate stem 44 extending axially of the passage 34 and spaced peripherally of the passage walls. The stem 44 is provided with a reduced stem end portion on which is slidably mounted a valve element 46. A compression spring 47 is located about the valve element 46, and tends to move the valve element 46 in a direction to urge the valve element into sealing relation with a cooperating valve seat 50 formed in the passage 34 at the end of the valve body means 32. For reasons which will later appear, the valve element 46 includes a projection 51 at its end that projects outwardly of the passage 34 and beyond the end of the valve body means 32 when the valve element 46 is seated on the valve seat 50.

A coupler nipple 52 is provided a longitudinal bore 53 therethrough. The head of the nipple 52 is provided with an annular groove 54 that is adapted to receive the locking balls 30 when the nipple 52 is effectively inserted into the sleeve member 21 and locked in place by the releasable means. Located at one side of the groove 54 toward the end of the nipple 52, is an inclined shoulder 55 that serves the purpose of limiting the insertion of the nipple 52 into the sleeve member 21 and of caming the locking balls 30 radially outwardly into the collar groove 27 upon insertion of the nipple 52 into the sleeve member 21 upon attachment. An O-ring 56 carried by the sleeve member 21 slidably engages the nose portion of the nipple 52 to provide an effective fluid seal when the nipple 52 is attached.

Another valve means is carried internally of the coupler nipple 52. This valve means includes a stud 57 fixed in the nipple bore 53 by a suitable retaining ring. The stud 57 includes a head with passageways to permit the flow of fluid, and a shank extending toward the nose end portion. Slidably mounted on the shank of the stud 57, is a valve element 60. A compression spring 61 located about the valve element 60 tends to urge the valve element 60 into sealing relation with a valve seat 62 adjacent the end of the nipple 52. The valve element 60 is provided with a projection 63 on its end that projects outwardly of the nipple bore 53 and beyond the end of the nipple 52, for reasons which will later appear.

When the coupler nipple 52 is detached, the valve element 60 is closed. In addition, the valve element 46 internally of the valve body means 32 is closed. Consequently, fluid flow from each coupler part is precluded. The compression spring 31 tends to urge the sleeve member 21 to its first position as determined by engagement of the shoulder 20 and abutment 23. In this first position of the sleeve member 21, the locking balls 30 are urged into the sleeve member bore 22 into a locking condition of the releasable means.

If the handle 40 is turned so that the cam 41 moves the valve body means 32 to its first position closely adjacent the sleeve member 21, the sleeve member 21 cannot be moved away from its first position so as to cause an unlocking of the releasable means. As a result, when the nose of the nipple 52 is inserted into the releasable means and sleeve member 21, the nipple shoulder 55 will engage the locking balls 30 and be prevented from moving fully into the sleeve member 21 for connection with the releasable means. Therefore, the projection 63 of the valve element 60 in the nipple 52 cannot engage the projection 51 of the valve element 46 so as to cause an opening of such valve elements 60 and 46, and possible opening of the valve elements 60 and 46 under fluid pressure is avoided.

Figure 2:
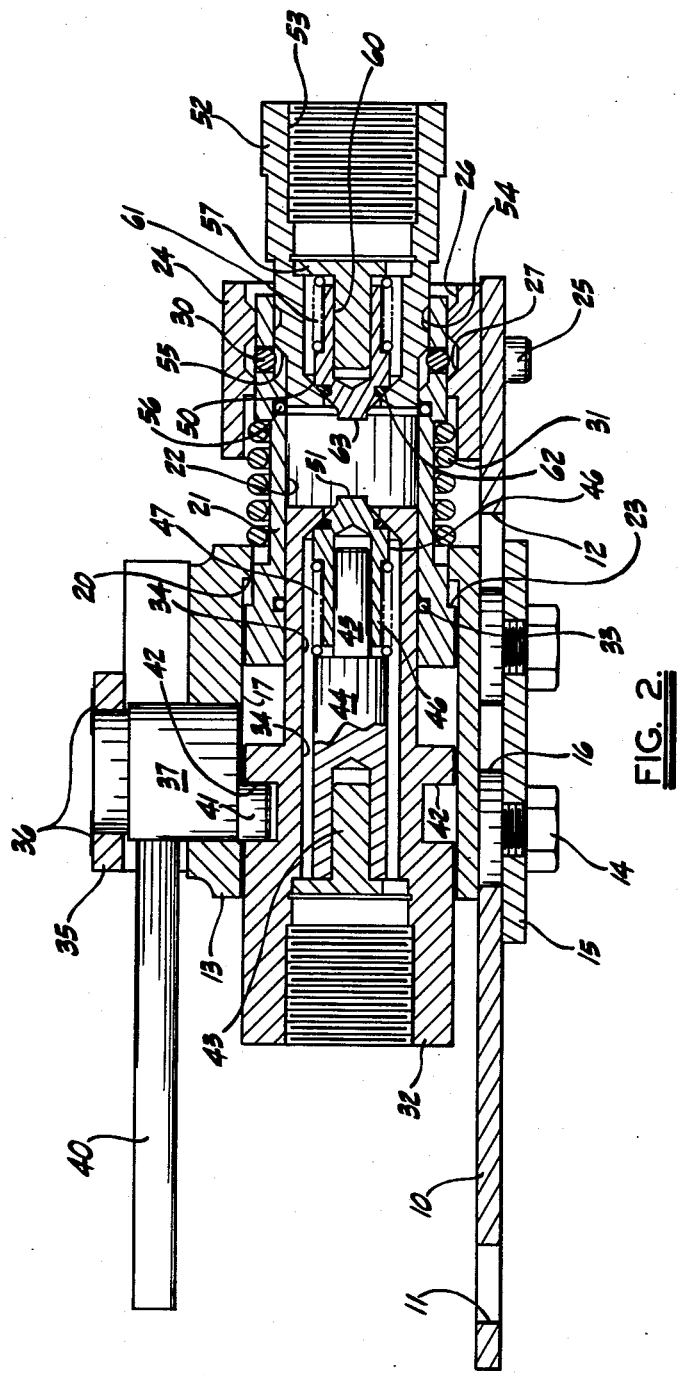
FIG. 2, is a cross-sectional view longitudinally through one pair of cooperating coupling parts, showing the nipple being inserted.

To effectively and operatively connect the nipple 52, the cam cylinder 37 is turned by the handle 40 so that the cam 41 moves the valve body means 32 to its second position in longitudinally spaced relation from the sleeve member 21. Then the nose of the nipple 52 is inserted into the end of the sleeve member 21 so that the nipple shoulder 55 engages the locking balls 30. Again, it will be understood that the locking balls 30 cannot move radially outward because the releasable means 24 is conditioned in its locking position. Therefore, as the nipple 52 is inserted, the nipple shoulder 55 engaging with the locking balls 30 will move the sleeve member 21 longitudinally away from its first position against the loading of the compression spring 31, as is illustrated in FIG. 2. When the locking balls 30 move into radial alignment with the collar groove 27, the nipple shoulder 55 will move the locking balls 30 radially outward into such groove 27, thereby permitting full insertion of the nipple 52 and alignment and location of the locking balls 30 in the nipple groove 54. The compression spring 31 then moves the sleeve member 21 back to its first position, together with the fully inserted nipple 52. The locking collar 24 maintains the locking balls 30 in the nipple groove 54, and the nipple 52 is effectively and operatively locked by the releasable means to the sleeve member.

It will be understood that during this connection of the nipple 52, the projections 51 and 63 of the valve elements 46 and 60 respectively do not engage, and the valve elements 46 and 60 are not opened. The connection of the nipple 52 is accomplished quickly and easily without being subject to fluid line pressure.

After the nipple 52 is attached, fluid line pressure and fluid flow is achieved by moving the valve body means 32 to its first position with the cam 41 so that the projections 51 and 63 of the valve elements 46 and 60 respectively engage and move the valve elements 46 and 60 off of their valve seats 50 and 62 respectively and thereby open the line for fluid flow. Of course, fluid flow can be shut off while the nipple 52 is attached simply by moving the valve body means 32 with the cam 41 to its second position as illustrated in FIG. 3. As the projections 51 and 63 of the valve elements 46 and 60 respectively disengage, the valve springs 47 and 61 urge the valve elements 46 and 60 respectively against their respective valve seats 50 and 62.

Automatic de-coupling is achieved when a pull is exerted on the hose (not shown) connected to the nipple 52 such as would be done if an implement being pulled by the tractor were accidentally or unintentionally disconnected. As an outward pull is exerted on the coupler nipple 52, the nipple 52, acting through the locking balls 30, will move the sleeve member 21 and the body member 13 as a unit relative to the mounting plate 10 against the loading of the compression spring 31, the guide bearings 16 slidably moving in the plate slot 12. If sufficient force has been exerted on the nipple 52 to overcome the spring loading, the sleeve member 21 will move to a position to align the locking balls 30 with the collar groove 26. At this point, the nose of the nipple 52 will move the locking balls 30 radially outward into the collar groove 26, and the releasable means will then unlock the nipple 52 and allow the nipple 52 to be completely withdrawn.

It will be understood that when the nipple 52 is unlocked by the releasable means and withdrawn from the sleeve member 21 and the releasable means, the valve elements 46 and 60 will disengage and automatically close to shut off the fluid pressure and stop the fluid flow in both coupling parts.

Under these circumstances, as soon as the nipple 52 is released, the compression spring 31 will move the sleeve member 21 and the body member 13 as a unit back to its original position relative to the mounting plate 10, the guide bearings 16 moving in the plate slot 12. When the sleeve member 21 is back in its original position, the locking balls 30 are again moved radially inward and the releasable means is locked. The coupling parts are then conditioned for subsequent use in the manner previously described.

Manual de-coupling is achieved in the same manner as automatic de-coupling described above. However, when manually de-coupling the nipple 52, it is preferable and advisable that the fluid pressure be shut off and that fluid flow be stopped. If the valve body means 32 is not already located in its second position, it should be moved to such second position by the cam 41, as is illustrated in FIG. 3. The valve elements 46 and 60 will then operatively disengage and close. Then sufficient pull can be exerted on the nipple 52 to effect release of the nipple 52 by the releasable means in the manner previously described with respect to automatic de-coupling.

I claim as my invention:

1. An automatic coupling device for use in a fluid circuit, comprising:
   a. A mounting means,
   b. a body member movably mounted on the mounting means,
   c. a sleeve member movably mounted on the body member, the sleeve member having a bore,
   d. a coupler nipple detachably connected to the sleeve member, the nipple including a first valve means urged toward a closed position and being movable to an open position,
   e. releasable means between the mounting means and the sleeve member for releasably retaining the nipple on the sleeve member,
   f. a valve body means having a passage with an inlet end for connection to a fluid line, the valve body means being slidably mounted in the bore of the sleeve member, the valve body means being movable to a first position to preclude substantially relative movement of the sleeve member and body member for locking of the nipple in the releasable means, and being movable to a second position to allow relative movement of the sleeve member and body member for insertion of the nipple in the releasable means, g. cam means connected to the valve body means for sliding the valve body means in the bore of the sleeve means and for moving the valve body means between the first and second positions, and h. the valve body means including a second valve means urged to a closed position and being movable to an open position, the first and second valve means engaging and opening when the valve body means is in the first position and the nipple is attached, to form a fluid passageway through the valve body means and nipple, and disengaging and closing when the valve body means is moved to the second position, even when the nipple is attached.

2. An automatic coupling device as defined, in claim 1, in which:

i. a resilient means urges the sleeve member to a position to lock the releasable means, the sleeve member being movable against the loading of the resilient means when the valve body means is in the second position upon insertion of the nipple in the releasable means.

3. An automatic coupling device as defined in claim 1, in which:

i. the valve body means in the first position engages the sleeve member to preclude relative movement of the sleeve member and body member to preclude insertion of the nipple into the releasable means, and in the second position being spaced from the sleeve member to permit relative movement of the sleeve member and body member and enable insertion of the nipple into the releasable means.

4. An automatic coupling device as defined in claim 1, in which:

i. the sleeve member is movable to a first position relative to the body member to lock the releasable means, and is movable away from its first position relative to the body member to unlock the releasable means when the valve body means is in its second position.

5. An automatic coupling device as defined in claim 4, in which:

j. a resilient means urges the sleeve member to its first position, the sleeve member being movable away from its first position against the loading of the resilient means.

6. An automatic coupling device as defined in claim 5, in which:

k. the releasable means includes a first locking element fixed relative to the mounting means, and a second cooperating locking element carried by the sleeve member, l. the nipple upon insertion into the releasable means engages the second locking element to move the sleeve member away from its first lock position against the loading of the resilient means when the valve body means is in its second position and, m. the resilient means urges the sleeve member back to its first position to lock the nipple on the sleeve with the releasable means.

7. An automatic coupling device as defined in claim 4, in which:

j. the valve body means in its first position engages the sleeve member in its first position to preclude relative movement of the sleeve member and body member and preclude insertion of the nipple into the releasable means and, k. the valve body means in its second position being spaced from the sleeve member in its first position to enable movement of the sleeve member away from its first position to permit insertion of the nipple into the releasable means for locking to the sleeve member.

8. An automatic coupling device as defined in claim 7, in which:

l. a resilient means is disposed operatively between the body member and the sleeve member, and urges the sleeve member to its first position to lock the releasable means, the sleeve member being movable away from its first position against the loading of the resilient means to unlock the releasable means and, m. the resilient means is disposed operatively between the body member and the releasable means, and urges the body member and the sleeve member to a position to lock the releasable means, the body member and the sleeve member being movable to another position against the loading of the resilient means to unlock the releasable means.

9. An automatic coupling device as defined in claim 7, in which:

l. the releasable means includes a first locking element fixed relative to the mounting means, and a second cooperating locking element carried by the sleeve member, m. the nipple upon insertion into the releasable means engages the second locking element to move the sleeve member away from its first position when the valve body means is in its second position n. a resilient means is disposed operatively between the body member and the sleeve member and urges the sleeve member to its first position to lock the releasable means, the sleeve member being movable away from its first position against the loading of the resilient means to unlock the releasable means, and o. the resilient means is disposed operatively between the body member and the first locking element, and urges the body member and sleeve member relative to the mounting means to a position to lock the releasable means, the body member and sleeve member being movable relative to the mounting means to another position against the loading of the resilient means to unlock the releasable means upon applying sufficient force to the second locking element with the nipple.

* * * * *